US012619961B2

(12) United States Patent
Kim-Koon et al.

(10) Patent No.: US 12,619,961 B2
(45) Date of Patent: May 5, 2026

(54) SYSTEM AND METHOD FOR INITIATING A TRANSFER OF RESOURCES

(71) Applicant: The Toronto-Dominion Bank, Toronto (CA)

(72) Inventors: Jeffrey Lee Kim-Koon, Markham (CA); Rimma Beilis, Vaughan (CA); Jeffrey John Piotrowski, Courtice (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/988,010

(22) Filed: Nov. 16, 2022

(65) Prior Publication Data

US 2024/0161070 A1    May 16, 2024

(51) Int. Cl.
*G06Q 20/10* (2012.01)
*G06Q 20/32* (2012.01)
*G06Q 20/34* (2012.01)
*G06Q 20/36* (2012.01)

(52) U.S. Cl.
CPC .......... *G06Q 20/10* (2013.01); *G06Q 20/325* (2013.01); *G06Q 20/351* (2013.01); *G06Q 20/356* (2013.01); *G06Q 20/36* (2013.01)

(58) Field of Classification Search
None
See application file for complete search history.

(56) References Cited

U.S. PATENT DOCUMENTS

| | | | |
|---|---|---|---|
| 6,450,407 B1 * | 9/2002 | Freeman ............ | G06K 19/0723 |
| | | | 235/487 |
| 8,276,814 B1 * | 10/2012 | Davis ................... | G06Q 20/352 |
| | | | 235/487 |
| 8,768,834 B2 | 7/2014 | Zacarias et al. | |
| 10,096,021 B2 | 10/2018 | Scipioni et al. | |
| 10,504,140 B2 | 12/2019 | Parekh | |
| 10,984,411 B1 * | 4/2021 | Hayes ................. | G06Q 20/387 |
| 2002/0077973 A1 * | 6/2002 | Ronchi ................ | G07F 7/1066 |
| | | | 705/39 |
| 2004/0182922 A1 * | 9/2004 | Talarico, Jr. ........... | G06Q 20/28 |
| | | | 235/380 |
| 2006/0289621 A1 * | 12/2006 | Foss, Jr. ................ | G06Q 20/10 |
| | | | 235/375 |

(Continued)

FOREIGN PATENT DOCUMENTS

| | | |
|---|---|---|
| AU | 2015268643 B2 | 12/2015 |
| WO | 2021002850 A1 | 1/2021 |

*Primary Examiner* — William J Jacob
(74) *Attorney, Agent, or Firm* — Rowand LLP

(57) ABSTRACT

A server computer system comprises a communications module; a processor coupled with the communications module; and a memory coupled to the processor and storing processor-executable instructions which, when executed by the processor, configure the processor to obtain, via the communications module, data; analyze the data to identify a stored-value card and an amount for the stored-value card; update a data record associated with the stored-value card based on the amount for the stored-value card; transfer resources to a network restricted data record based on the amount for the stored-value card; determine a trigger condition; and responsive to determining the trigger condition, initiate a transfer of resources from the network restricted data record to a network unrestricted data record.

17 Claims, 7 Drawing Sheets

(56) References Cited

U.S. PATENT DOCUMENTS

| | | | |
|---|---|---|---|
| 2007/0152038 A1* | 7/2007 | Ciancio | G06Q 20/363 235/383 |
| 2008/0133266 A1* | 6/2008 | Allen | G06Q 40/08 705/2 |
| 2010/0049653 A1* | 2/2010 | Grotto | G06Q 20/105 705/41 |
| 2010/0088188 A1* | 4/2010 | Kumar | G06Q 20/10 705/17 |
| 2011/0057025 A1* | 3/2011 | Denzer | G06Q 20/28 235/375 |
| 2011/0295705 A1* | 12/2011 | Kasmei | G06Q 40/12 705/16 |
| 2012/0303425 A1* | 11/2012 | Katzin | G06Q 20/4016 705/16 |
| 2014/0114842 A1* | 4/2014 | Blackhurst | G06Q 30/06 705/39 |
| 2015/0066757 A1 | 3/2015 | Shenoy et al. | |
| 2015/0302394 A1* | 10/2015 | Harper | G06Q 20/10 705/41 |
| 2017/0213216 A1* | 7/2017 | Phillips | G06Q 20/405 |
| 2017/0221050 A1* | 8/2017 | Jivraj | G06Q 20/204 |
| 2018/0268386 A1* | 9/2018 | Wack | G06Q 20/02 |
| 2019/0197577 A1* | 6/2019 | Rhee | G06Q 20/023 |
| 2020/0097937 A1* | 3/2020 | Dunjic | G06Q 20/40 |
| 2020/0104829 A1* | 4/2020 | Arora | G06Q 20/202 |
| 2020/0327548 A1* | 10/2020 | Hartard | G06Q 20/12 |
| 2023/0045946 A1* | 2/2023 | Duane | G06Q 20/065 |

* cited by examiner

100

500

505

510

600

Receive a request for a stored-value card

610

Generate a stored-value card identifier

620

Create a data record associated with the stored-value card

630

700

Retrieve a white-label stored-value card template

710

Obtain an image for the stored-value card

720

Generate a machine-readable code for the stored-value card

730

Create a digital representation of the stored-value card

740

Provide the digital representation of the stored-value card to the computing device

750

800

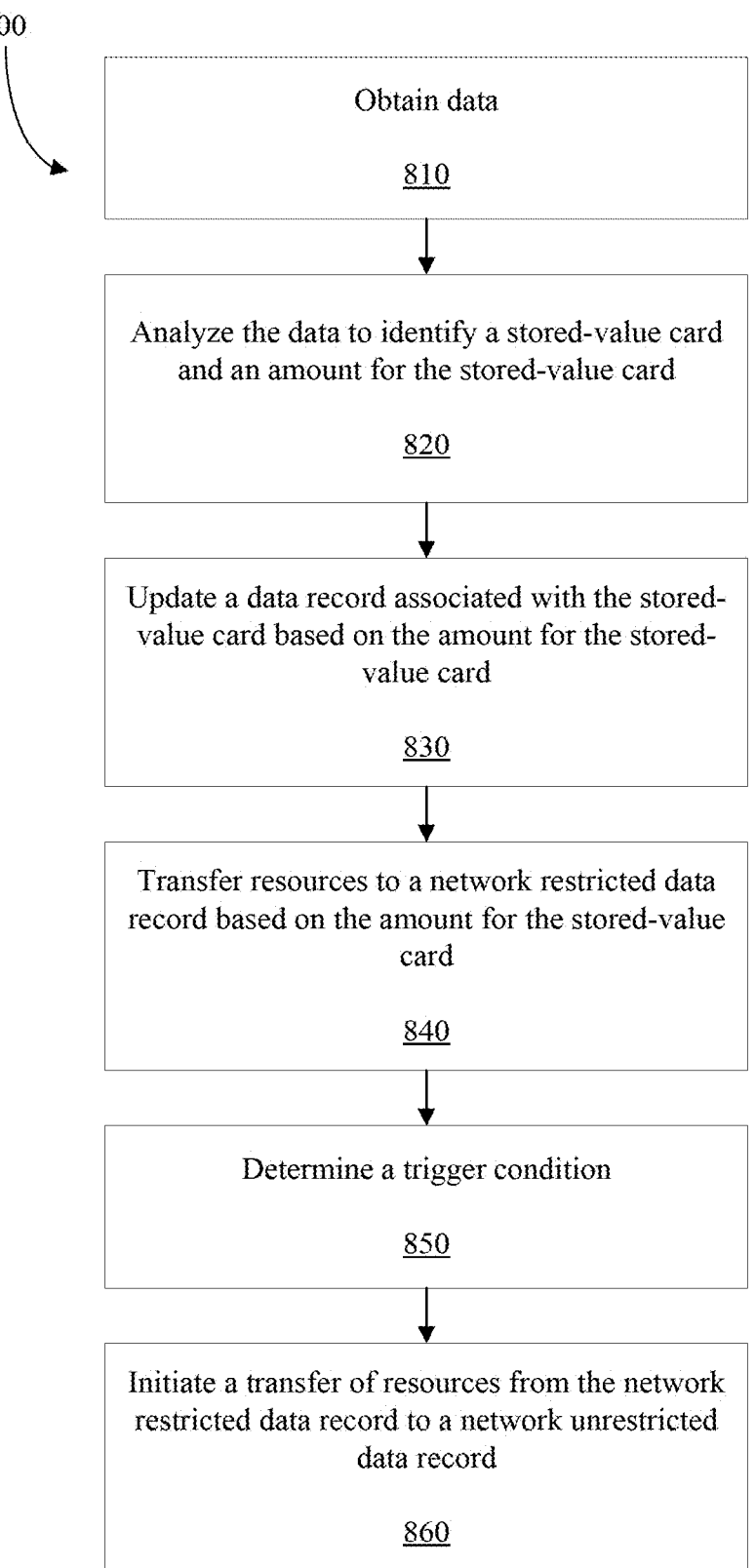

Obtain data

810

Analyze the data to identify a stored-value card
and an amount for the stored-value card

820

Update a data record associated with the stored-
value card based on the amount for the stored-
value card

830

Transfer resources to a network restricted data
record based on the amount for the stored-value
card

840

Determine a trigger condition

850

Initiate a transfer of resources from the network
restricted data record to a network unrestricted
data record

SYSTEM AND METHOD FOR INITIATING A TRANSFER OF RESOURCES

TECHNICAL FIELD

The present application relates to systems and methods for initiating a transfer of resources.

BACKGROUND

Transfers of resources are often performed at a high rate and occupy a significant amount of bandwidth on a network.

BRIEF DESCRIPTION OF THE DRAWINGS

Embodiments are described in detail below, with reference to the following drawings:

FIG. 8 is a flowchart showing operations performed by a server computer system in initiating a transfer of resources according to an embodiment.

Like reference numerals are used in the drawings to denote like elements and features.

DETAILED DESCRIPTION OF VARIOUS EMBODIMENTS

Figure 1:
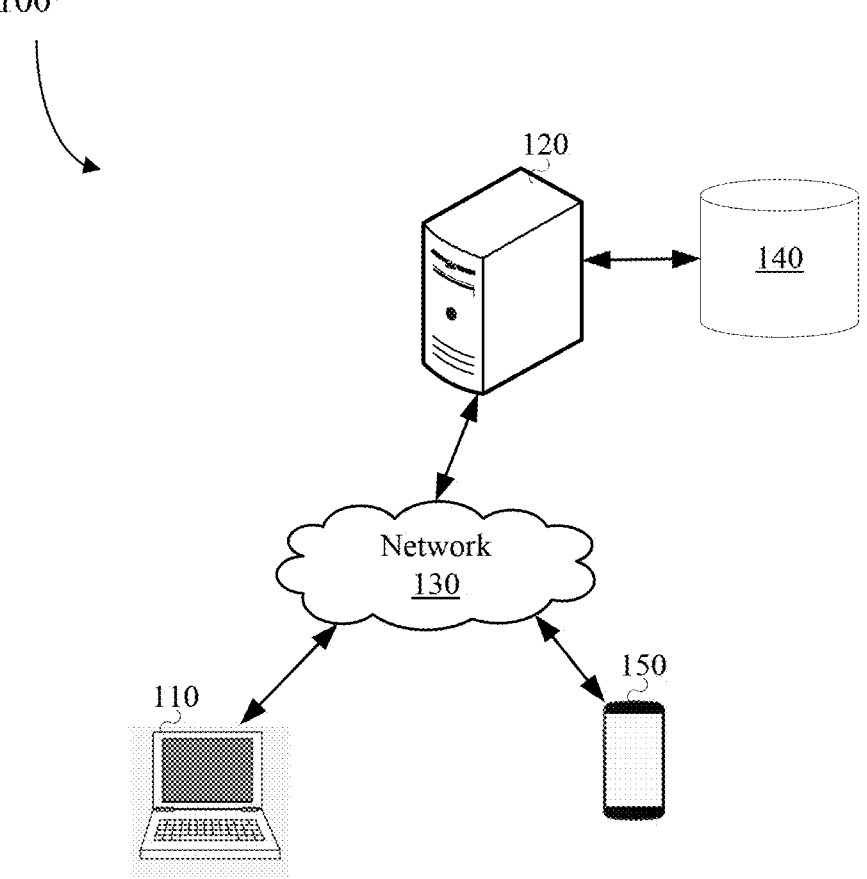
FIG. 1 is a schematic operation diagram illustrating an operating environment of an example embodiment.

Accordingly, in one aspect there is provided a server computer system comprising a communications module; a processor coupled with the communications module; and a memory coupled to the processor and storing processor-executable instructions which, when executed by the processor, configure the processor to obtain, via the communications module, data; analyze the data to identify a stored-value card and an amount for the stored-value card; update a data record associated with the stored-value card based on the amount for the stored-value card; transfer resources to a network restricted data record based on the amount for the stored-value card; determine a trigger condition; and responsive to determining the trigger condition, initiate a transfer of resources from the network restricted data record to a network unrestricted data record.

In one or more embodiments, determining the trigger condition includes determining that a total amount of resource stored in the network restricted data record is greater than a threshold.

In one or more embodiments, determining the trigger condition includes determining that an amount of network traffic is less than a threshold.

In one or more embodiments, the network traffic includes payment rail network traffic.

In one or more embodiments, the processor-executable instructions, when executed by the processor, further configure the processor to receive, from a computing device, a request for the stored-value card; generate a stored-value card identifier for the stored-value card; and create the data record associated with the stored-value card, the data record including the stored-value card identifier.

In one or more embodiments, the processor-executable instructions, when executed by the processor, further configure the processor to retrieve, from a database, a white-label stored-value card template; obtain an image for the stored-value card; generate a machine-readable code for the stored-value card; and create a digital representation of the stored-value card by populating a first interface element of the white-label stored-value card template to include the image for the stored-value card and a second interface element of the white-label stored-value card template to include the machine-readable code for the stored-value card.

In one or more embodiments, the processor-executable instructions, when executed by the processor, further configure the processor to provision a mobile wallet resident on the computing device with the digital representation of the stored-value card.

In one or more embodiments, the processor-executable instructions, when executed by the processor, further configure the processor to store the digital representation of the stored-value card in a database in association with an account that is accessible via a mobile application resident on the computing device.

In one or more embodiments, the network restricted data record tracks a total amount of resources based on stored-value cards used to complete transactions at a merchant.

In one or more embodiments, the processor-executable instructions, when executed by the processor, further configure the processor to transfer resources from a network restricted data record that tracks a total amount of resources based on stored-value cards purchased for the merchant to the network restricted data record that tracks the total amount of resources based on stored-value cards used to complete transactions at the merchant.

According to another aspect there is provided a computer-implemented method comprising obtaining, via a communications module, data; analyzing the data to identify a stored-value card and an amount for the stored-value card; updating a data record associated with the stored-value card based on the amount; transfer resources to a network restricted data record based on the amount for the stored-value card; determining a trigger condition; and responsive to determining the trigger condition, initiating a transfer of resources from the network restricted data record to a network unrestricted data record.

In one or more embodiments, determining the trigger condition includes determining that a total amount of resource stored in the network restricted data record is greater than a threshold.

In one or more embodiments, determining the trigger condition includes determining that an amount of network traffic is less than a threshold.

In one or more embodiments, the network traffic includes payment rail network traffic.

In one or more embodiments, the method further comprises receiving, from a computing device, a request for the stored-value card; generating a stored-value card identifier for the stored-value card; and creating the data record associated with the stored-value card, the data record including the stored-value card identifier.

In one or more embodiments, the method further comprises retrieving, from a database, a white-label stored-value card template; obtaining an image for the stored-value card; generating a machine-readable code for the stored-value card; and creating a digital representation of the stored-value card by populating a first interface element of the white-label stored-value card template to include the image for the stored-value card and a second interface element of the white-label stored-value card template to include the machine-readable code for the stored-value card.

In one or more embodiments, the method further comprises provisioning a mobile wallet resident on the computing device with the digital representation of the stored-value card.

In one or more embodiments, the method further comprises storing the digital representation of the stored-value card in a database in association with an account that is accessible via a mobile application resident on the computing device.

In one or more embodiments, the network restricted data record tracks a total amount of resources based on stored-value cards used to complete transactions at a merchant.

According to another aspect there is provided a non-transitory computer readable storage medium comprising computer-executable instructions which, when executed, configure a processor to obtain, via a communications module, data; analyze the data to identify a stored-value card and an amount for the stored-value card; update a data record associated with the stored-value card based on the amount for the stored-value card; transfer resources to a network restricted data record based on the amount for the stored-value card; determine a trigger condition; and responsive to determining the trigger condition, initiate a transfer of resources from the network restricted data record to a network unrestricted data record.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, aspects of the disclosure transform a computer into a special-purpose computing device when configured to execute the instructions described herein.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The computing device 110 may be a laptop computer as shown in FIG. 1. However, the computing device 110 may be a computing device of another type such as for example a smartphone, personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The computing device 110 may be associated with a merchant and exchange data with the server computer system 120. The data may include transaction data and/or stored-value card management data.

The server computer system 120 may be a financial institution server and may maintain a database 140 that includes various data records. At least some of the data records may be associated with stored-value cards. For example, a data record may be associated with a stored-value card and may include, for example, a stored-value card identifier for the stored-value card, a balance of the stored-value card, etc. The server computer system 120 may communicate with the database 140 directly or through the network 130.

The system 100 may additionally include a computing device 150 that may be associated with a customer or a purchaser of one or more stored-value cards. The computing device 150 may be, for example, a laptop, a smartphone, personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The computing device 150 may communicate with the computing device 110 and/or the server computer system 120 to purchase, store and redeem one or more stored-value cards.

As will be described in more detail below, the server computer system 120 may provide a stored-value card management tool that may be accessed by a merchant operating the computing device 110 to manage stored-value cards and/or a customer operating the computing device 150 to purchase, store and redeem one or more stored-value cards.

Figure 2:
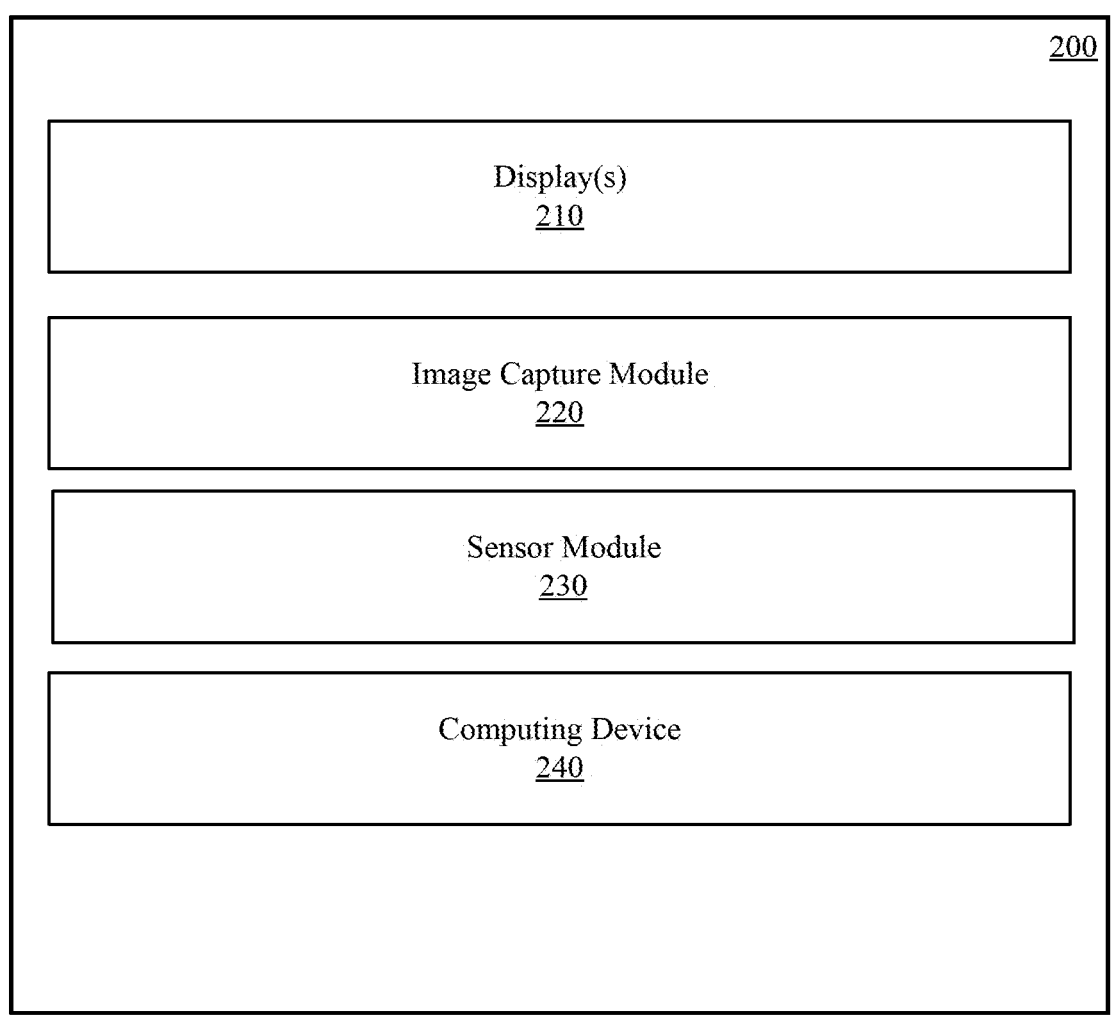
FIG. 2 is a simplified schematic diagram showing components of a computing device.

FIG. 2 is a simplified schematic diagram showing components of an exemplary computing device 200. The computing device 110 and the computing device 150 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
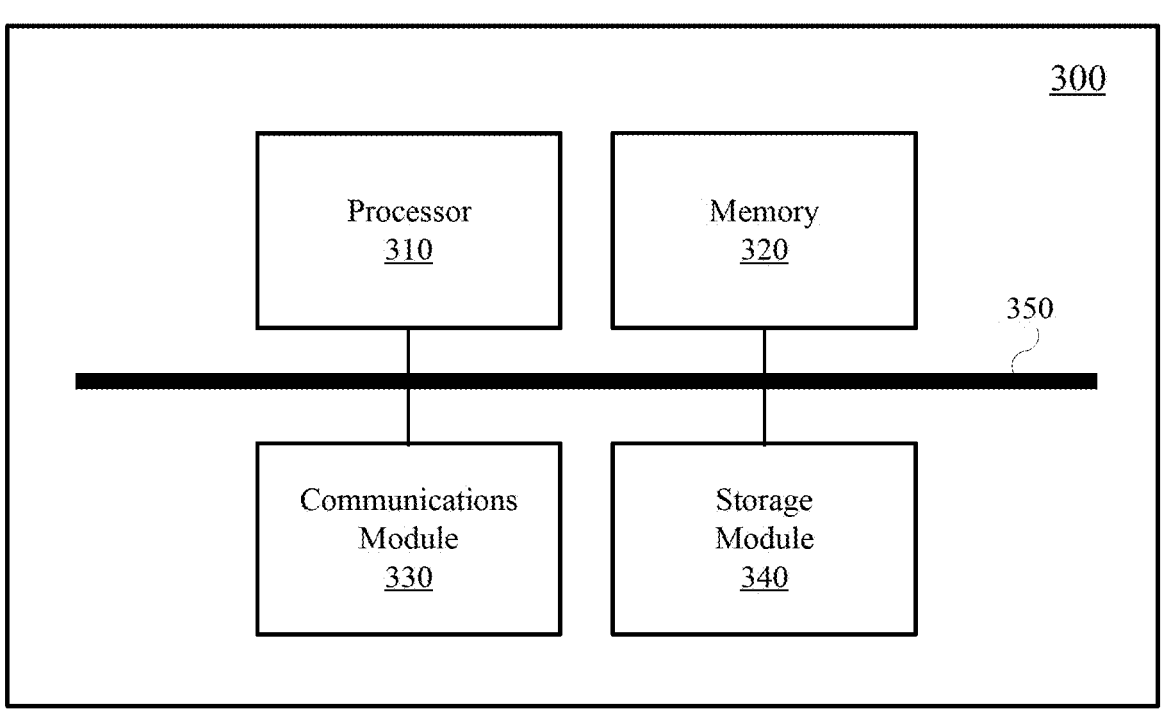
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2) and/or server computer system 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM™, INTEL™ x86, POWERPC™ processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
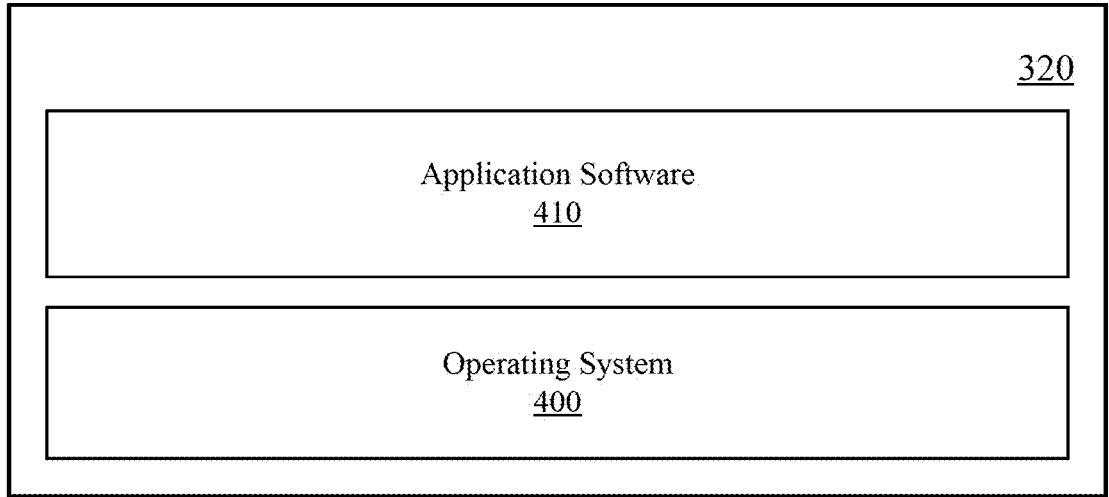
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server computer system 120.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a stored-value card management application. The stored-value card management application may be provided as a web application and/or a mobile application. The stored-value card management application may be configured to present one or more graphical user interfaces on a display of the computing device 110 and/or the computing device 150 and may provide various stored-value card management functions.

The stored-value card management application may require authentication. For example, the stored-value card management application may be accessed on the computing device 110 and/or the computing device 150 via an internet web browser and may require creation of an account such as for example a merchant account or a customer account. Account creation may require the submission of credentials to be used for authentication such as for example a username and a password. The username may include an email address. It will be appreciated that in one or more embodiments the stored-value card may be downloaded or resident on the computing device 110 and/or the computing device 150 and thus may be accessed directly thereon.

To access the incentive management application on the computing device 110 and/or the computing device 150, the user may be prompted to enter the credentials submitted during the account creation. For example, the user may be prompted to submit a username and a password associated with their account. In response to receiving the credentials, the server computer system 120 may authenticate the computing device 110 and/or the computing device 150 (or user) and may identify an account associated therewith. As mentioned, the account may be a merchant account or a customer account.

Within the stored-value card management application, a merchant may operate the computing device 110 to communicate with the server computer system 120 to perform stored-value card management operations. The stored-value card management functions may include defining merchant information such as for example a merchant name, merchant address, etc. The stored-value card management functions may additionally or alternatively include defining one or more parameters for stored-value cards to be offered for purchase within the stored-value card management application. The one or more parameters may include defining denominations of stored-value cards that the merchant would like to offer for sale. The denominations may be, for example, $5, $10, $25, $50, etc.

The stored-value card management operations may include selecting one or more white-label stored-value card templates. In one or more embodiments, within the stored-value card management application, the server computer system 120 may provide a graphical user interface for display on the computing device 110 that includes one or more white-label stored-value card templates that may be selected by, for example, performing a tap gesture on a display screen of the computing device 110 at a location that corresponds to the location of one of the white-label stored-value card templates.

Figure 5:
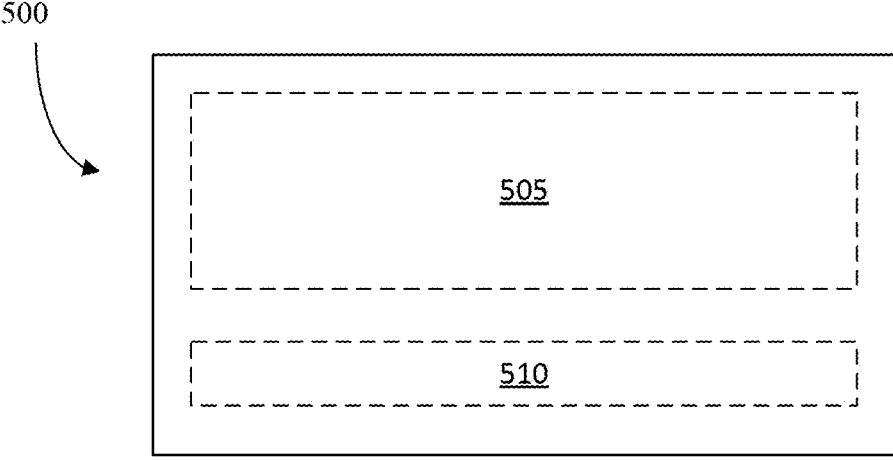
FIG. 5 is an example white-label stored-value card template according to an embodiment.

The white-label stored-value card templates may include stored-value card templates that were previously configured. The white-label stored-value card templates may be used to generate digital representation of a stored-value card for the merchant. An example white-label stored-value card template 500 is shown in FIG. 5. In this example, the white-label stored-value card template 500 includes a first interface element 505 and a second interface element 510. The interface elements are fixed in position relative to one another. In one or more embodiments, the first interface element 505 may be populated using an image associated with the merchant and the second interface element 510 may be populated using a machine-readable code generated by the server computer system 120.

It will be appreciated that different white-label stored-value card templates may have additional or alternative interface elements compared to that shown in FIG. 5. Further, different white-label stored-value card templates may include different orientations of interface elements. Still further, different white-label stored-value card templates may require different types of data to populate the interface elements such as for example the stored-value card identifier, the denomination of the stored-value card, text identifying the merchant, etc. Further, different white-label stored-value card templates may have different appearances such as for example different colours, skins, etc.

As mentioned, in one or more embodiments, the white-label stored-value card template may include a first interface element that may be populated using an image associated with the merchant. As such, the stored-value card management operations may include providing an image to be used to populate the white-label stored-value card template. In one or more embodiments, the server computer system 120 may provide a graphical user interface for display on the computing device 110 that includes a selectable interface element for uploading the image. Responsive to selection of the selectable interface element, the server computer system 120 may request access to an image library resident on the computing device 110. The user may select an image from the image library and in this manner the image may be obtained.

It will be appreciated that the image may be obtained in other manners. For example, the user may perform operations to cause the computing device 110 to navigate to a particular file folder or website that may include the image to be provided to the server computer system 120.

In one or more embodiments, the server computer system 120 may obtain the image automatically by engaging an application programming interface (API) such as for example Google™ Images™ API. In this example, the server computer system 120 may engage the API to identify or obtain an image using criteria such as for example the name of the merchant.

In one or more embodiments, one or more images obtained by the server computer system 120 may be stored in a database in association with the merchant. As will be described in more detail below, the selected white-label stored-value card template and/or the one or more images obtained by the server computer system 120 may be used to create a digital representation of a stored-value card.

The stored-value card management operations may additionally include defining criteria to enable or allow a customer to locate or identify the merchant within the stored-value card management application. For example, the merchant may be a pizza place located in New York City and as such the merchant may define hashes "#pizza" and "#NYC".

It will be appreciated that in one or more embodiments, the server computer system 120 may define at least some of the criteria. For example, the merchant may have previously provided their address and as such the server computer system 120 may use the address to define the criteria to enable or allow a customer to locate or identify the merchant within the stored-value card management application.

It will be appreciated that the criteria may be used to obtain the image that may be used to populate an interface element of a white-label stored-value card template. For example, the merchant may define the hash "#pizza" and as such the server computer system 120 may engage an API to obtain an image associated with "#pizza".

The stored-value card management application may be accessed by a customer to locate merchants that offer stored-value cards for purchase. Put another way, within the stored-value card management application, a customer may operate the computing device 150 to communicate with the server computer system 120 to purchase, store, track and redeem stored-value cards.

The server computer system 120 may generate recommendations for merchants that offer digital stored-value cards for purchase within the stored-value card management application. The server computer system 120 may cause the recommendations to be displayed on the computing device 150 within the stored-value card management application. The recommendations may be based on, for example, a location of the customer and this may be based on location data received from the computing device 150. In one or more embodiments, within the stored-value card management application, a search bar may be displayed that may allow the customer to enter one or more search terms to locate or identify a merchant. For example, a merchant may have defined the hash "#pizza". A customer may search for the hash "#pizza" and the server computer system 120 may cause the computing device 150 to display any merchants associated with the hash "#pizza" that are located within a threshold distance of the computing device 150 that have stored-value cards available for purchase.

The customer may select a particular merchant and may purchase a stored-value card therefrom. The customer may select a denomination for the stored-value card and this may be based on criteria defined by the merchant. For example, a merchant may wish to only offer stored-value cards of the denominations $25 and $50 and as such the customer may be prompted to select $25 or $50 (or multiples thereof) as the denomination for the stored-value card.

It will be appreciated that to complete a purchase of the stored-value card, the customer may be required to enter payment information such as for example credit card information. In one or more embodiments, the stored-value card management application may display input fields for manually entering the payment information. In one or more embodiments, the stored-value card management application may display a selectable option that, when selected, displays a mobile or digital wallet resident on the computing device 150 and allows the customer to purchase the stored-value card using Apple™ Pay, Google™ Pay, etc. The server computer system 120 may perform operations to complete the purchase of the stored-value card and to create the stored-value card.

Figure 6:
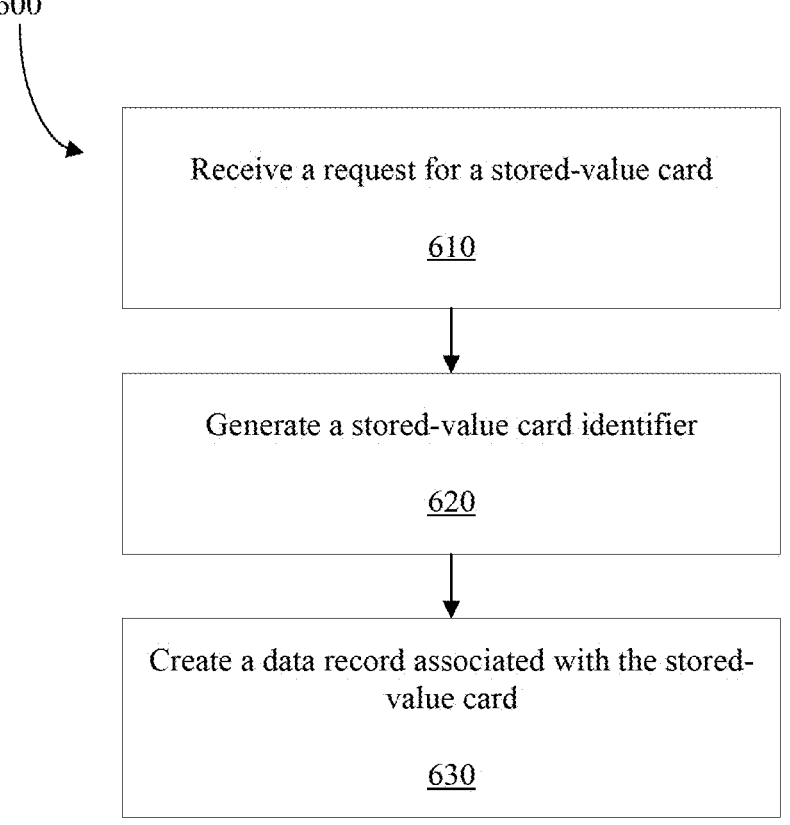
FIG. 6 is a flowchart showing operations performed by a server computer system in creating a stored-value card according to an embodiment.

Reference is made to FIG. 6, which illustrates, in flowchart form, a method 600 for creating a stored-value card. The method 600 may be implemented by a computing device having suitable processor-executable instructions for causing the computing device to carry out the described operations. The method 600 may be implemented, in whole or in part, by the server computer system 120. The server computer system 120 may offload some of the operations to the computing device 150, for example.

The method 600 includes receiving a request for a stored-value card (step 610).

In one or more embodiments, the request for the stored-value card may be received from the computing device 150. For example, within the stored-value card management application, a customer may purchase a stored-value card for a particular merchant and in response the server computer system 120 may receive the request for the stored-value card. The request may define criteria for the stored-value card such as for example the merchant associated with the stored-value card, the denomination of the stored-value card, etc. The request may also identify the customer or the account used to purchase the stored-value card.

The method 600 includes generating a stored-value card identifier (step 620).

Responsive to receiving the request for the stored-value card, the server computer system 120 may generate a stored-value card identifier.

In one or more embodiments, the stored-value card identifier may be generated using a software module such as for example a random number generator. For example, the server computer system 120 may engage a random number generator to generate a random sixteen (16) digit number and the sixteen (16) digit number may be the stored-value card identifier.

In one or more embodiments, at least a portion of the stored-value card identifier may be fixed. For example, the first four (4) digits of the sixteen (16) digit number may be fixed and this may be used, for example, to identify a merchant. The remaining twelve (12) digits may be generated by engaging a random number generator.

In one or more embodiments, the stored-value card identifier may follow a sequence of identifiers. For example, a stored-value card identifier may end with one or more digits and the one or more digits may be incremented by a set amount, such as for example one (1) digit, each time a new stored-value card identifier is to be generated.

The method 600 includes creating a data record associated with the stored-value card (step 630).

In one or more embodiments, the server computer system 120 may create a data record associated with the stored-value card in a database such as for example the database 140. The data record may be associated with the customer and this may be done using, for example, authentication provided by the customer when logging into the stored-value card management application. The data record may additionally be associated with or may include the stored-value card identifier. The data record may additionally include an amount of the stored-value card. The amount of the stored-value card may be maintained and updated by the server computer system 120 as will be described in more details below. In this manner, the stored-value card may be generated or created by the server computer system 120.

Figure 7:
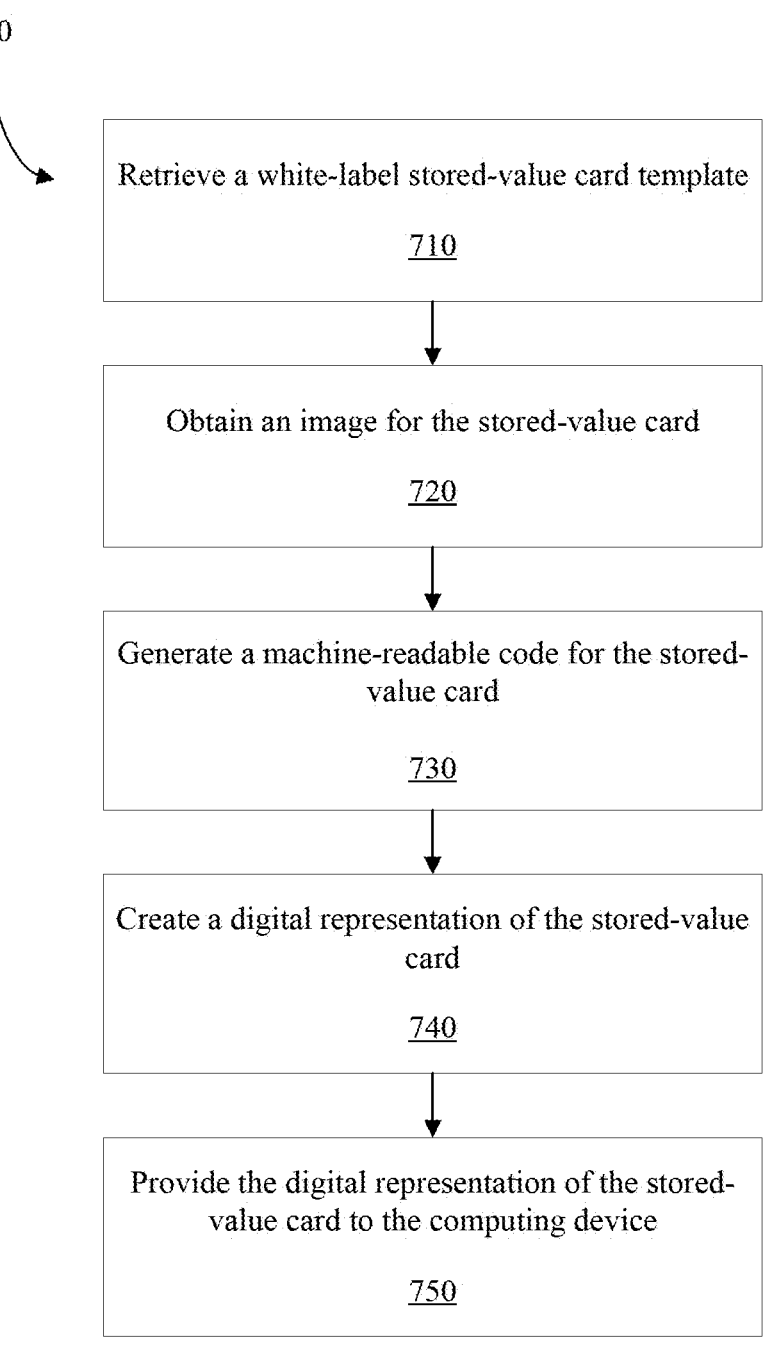
FIG. 7 is a flowchart showing operations performed by a server computer system in creating a digital representation of the stored-value card according to an embodiment.

Once the stored-value card has been created, the server computer system 120 may perform operations to generate or create a digital representation of the stored-value card. Reference is made to FIG. 7, which illustrates, in flowchart form, a method 700 for creating a digital representation of the stored-value card. The method 700 may be implemented by a computing device having suitable processor-executable instructions for causing the computing device to carry out the described operations. The method 700 may be implemented, in whole or in part, by the server computer system 120. The server computer system 120 may offload some of the operations to the computing device 150, for example.

The method 700 includes retrieving, from a database, the white-label stored-value card template (step 710).

As mentioned, the particular merchant associated with the stored-value card may have selected or defined a particular white-label stored-value card template for the stored-value card. As such, the server computer system 120 may retrieve, from the database, the white-label stored-value card template that was selected or defined.

The method 700 includes obtaining an image for the stored-value card (step 720).

As mentioned, within the stored-value card management application, the merchant may perform stored-value card management operations that may include providing an image to be used to populate the white-label stored-value card template. As such, in one or more embodiments, the image for the stored-value card may be retrieved from the database 140. For example, as mentioned, the merchant may have uploaded or provided the image that is to be used for the digital representation of the stored-value card and as such the server computer system 120 may be retrieved from the database 140.

The method 700 includes generating a machine-readable code for the stored-value card (step 730).

As mentioned, the white-label stored-value card template 500 may include a second interface element 505 that may be populated using a machine-readable code generated by the server computer system 120.

In one or more embodiments, the server computer system 120 may engage an application programming interface (API) such as for example a quick response (QR) code generator API that may be used to generate the machine-readable code.

The machine-readable code may include information identifying the stored-value card. For example, the server computer system 120 may generate the machine-readable code based on the stored-value card identifier of the stored-value card.

The method 700 includes creating a digital representation of the stored-value card (step 740).

In one or more embodiments, the server computer system 120 creates a digital representation of the stored-value card by populating the first interface element of the white-label stored-value card template using the image obtained during step 720 and by populating the second interface element of the white-label stored-value card template using the machine-readable code generated during step 730. In this manner, the server computer system 120 creates a digital representation of a stored-value card.

The server computer system 120 provides the digital representation of the stored-value card to the computing device 150 (step 750).

In one or more embodiments, the server computer system 120 may provision a mobile or digital wallet resident on the computing device 150 with the digital representation of the stored-value card. The customer may open the mobile or digital wallet on the computing device 150 to cause the computing device 150 to display the digital representation of the stored-value card. It will be appreciated that displaying the digital representation of the stored-value card may include displaying the machine-readable code. The machine-readable code may be scanned by a scanning device to redeem or otherwise use the stored-value card.

In one or more embodiments, the server computer system 120 may store the digital representation of the stored-value card in association with the account of the customer. In these embodiments, the customer may open the stored-value card management application on the computing device 150 and may select an interface element that may cause the server computer system 120 to retrieve the digital representation of the stored-value card and provide it for display on the display screen of the computing device 150. It will be appreciated that displaying the digital representation of the stored-value card may include displaying the machine-readable code. The machine-readable code may be scanned by a scanning device to redeem or otherwise use the stored-value card.

In one or more embodiments, within the stored-value card management application, the customer may select an interface element to view all purchase stored-value cards and in response the server computer system 120 may cause the computing device 150 to display all of the stored-value cards associated with the customer. In one or more embodiments, only stored-value cards that have a remaining balance or a balance over $0 may be displayed and any stored-value cards that do not have a balance may be accessed in a history page within the stored-value card management application.

The customer may redeem or otherwise use the stored-value card to offset or reduce a transaction amount of a purchase made at the merchant. For example, the customer may visit a particular merchant and may present the stored-value card. The merchant may operate a computing device such as for example the computing device 110 and/or a point-of-sale device to scan or enter the stored-value card identifier. As another example, the customer may enter the stored-value card identifier on a web site or web page associated with the merchant and this may be done, for example, during checkout.

The computing device may communicate the stored-value card identifier as part of transaction data to the server computer system 120. The server computer system 120 may perform operations to update a balance of the stored-value card and to initiate a transfer of resources.

Reference is made to FIG. 8, which illustrates, in flowchart form, a method 800 for initiating a transfer of resources. The method 800 may be implemented by a computing device having suitable processor-executable instructions for causing the computing device to carry out the described operations. The method 800 may be implemented, in whole or in part, by the server computer system 120. The server computer system 120 may offload some of the operations to the computing device 110 and/or the computing device 150, for example.

The method 800 includes obtaining data (step 810).

In one or more embodiments, the data may include transaction data and the server computer system 120 may obtain the transaction data from a computing device associated with the merchant. The computing device may include the computing device 110, a point-of-sale terminal, or another type of computing device associated with the merchant.

The transaction data may include a transaction identifier that may be unique to that particular transaction. The transaction data may include a transaction amount, payment information such as for example credit card information, a stored-value card identifier and a transaction amount for the stored-value card, etc.

It will be appreciated in one or more embodiments that the server computer system 120 may be responsible for processing the transaction and as such the server computer system 120 may receive a request to complete a transaction and may perform operations to complete the transaction. The request to complete the transaction data may include the transaction data described herein.

The method 800 includes analyzing the data to identify a stored-value card and an amount for the stored-value card (step 820).

As mentioned, in one or more embodiments, the data may include transaction data. The server computer system 120 may analyze the transaction data to identify a stored-value card used for a transaction and a transaction amount for the stored-value card. The stored-value card may be identified using the stored-value card identifier. The transaction amount is the amount of the stored-value card used for the purchase.

In one or more embodiments, the transaction amount for the stored-value card may be less than a balance of the stored-value card. For example, a stored-value card may have a balance of $50 and the transaction data may identify that the amount of the transaction is $35. In this example, the transaction data identifies that the transaction amount for the stored-value card is $35.

In one or more embodiments, the transaction amount for the stored-value card may be equal to a balance of the stored-value card. For example, a stored-value card may have a balance of $50 and the transaction data may identify that the amount of the transaction is $50. In this example, the transaction data identifies that the transaction amount for the stored-value card is $50.

In one or more embodiments, the transaction amount for the stored-value card may be greater than a balance of the stored-value card. For example, a stored-value card may have a balance of $50 and the transaction data may identify that the amount of the transaction is $75. In this example, the transaction data identifies that the transaction amount for the stored-value card is $50. The transaction data may also identify that the outstanding amount of the transaction ($25) was paid using a credit card, cash, etc. In embodiments where the server computer system 120 is responsible for processing the transaction, the server computer system 120 may perform operations to complete the payment using the credit card, for example.

The method 800 includes updating a data record associated with the stored-value card based on the amount (step 830).

In one or more embodiments, the server computer system 120 communicates with the database to update the data record associated with the stored-value card. The data record may be updated based on the amount for the stored-value card which may include a transaction amount.

In one or more embodiments, updating the data record may include subtracting the transaction amount for the stored-value card from a current balance of the stored-value card. For example, the stored-value card may have a balance of $50 and the transaction data may identify that the amount of the transaction for the stored-value card is $35. As such, the server computer system 120 may update the data record to update the balance of the stored-value card to $15. As another example, the stored-value card may have a balance of $50 and the transaction data may identify that the amount of the transaction for the stored-value card is $50. As such, the server computer system 120 may update the data record to update the balance of the stored-value card to $0.

In one or more embodiments, the server computer system 120 may determine that the updated balance of the stored-value card is equal to $0 and in response the server computer system 120 may perform operations to remove or delete the stored-value card. For example, the server computer system 120 may delete the data record associated with the stored-value card or may perform operations to deactivate or archive the data record associated with the stored-value card. Further, the server computer system 120 may perform operations to remove the digital representation of the stored-value card from the computing device 150. For example, the server computer system 120 may communicate with the computing device 150 to remove the stored-value card from the digital or mobile wallet resident thereon. As another example, the server computer system 120 may remove the stored-value card from the stored-value card management application such that it is no longer visible when the customer is logged into the stored-value card management application. As yet another example, the server computer system 120 may update a status of the stored-value card within the stored-value card management application such that it is no longer active or visible but may be viewed from a history page that may be available within the stored-value card management application.

The method 800 includes transferring resources to a network restricted data record based on the transaction amount for the stored-value card (step 840).

The server computer system 120 may maintain one or more data records that are network restricted. In one or more embodiments, the network restricted data record may include a data record that is associated with the merchant but is not accessible by the merchant. In one or more embodiments, a data record that is not accessible by the merchant may include a data record that the merchant has read-only access to. In one or more embodiments, a data record that is not accessible by the merchant may include a data record that the merchant cannot access. The one or more network restricted data records may store data that reflect an amount of resources. At least a first one of the data records may track a total amount of resources based on stored-value cards purchased for the merchant and at least a second one of the data records may track a total amount of resources based on stored-value cards used to complete transactions at the merchant.

In one or more embodiments, each time a stored-value card is purchased for the merchant, the server computer system 120 may update the first data record. For example, a customer may purchase a stored-value card for a particular merchant for $25 and in response the server computer system 120 may complete a transaction for the purchase and may update the first data record to include the $25.

In one or more embodiments, each time a stored-value card is used to complete a purchase at the merchant, the server computer system 120 may update the second data record. For example, a customer may redeem $25 from a stored-value card for a transaction at a particular merchant and in response the server computer system 120 may update the second data record to include the $25. It will be appreciated that in one or more embodiments the server computer system 120 may transfer the $25 from the first data record to the second data record.

It will be appreciated that in one or more embodiments, an input/output modifier may be applied to the resource prior to be transferred into the first data record and/or the second data record and the input/output modifier may be a set fee such as for example a $1 fee for managing stored-value cards for the merchant.

The method 800 includes determining a trigger condition (step 850).

In one or more embodiments, the trigger condition may be associated with the first or second data record associated with the merchant. For example, the trigger condition may be associated with the second data record associated with the merchant. In these embodiments, the trigger condition may include determining that a total amount of resources in the second data record is greater than a threshold. For example, the threshold may be $500 and as such responsive to determining that the total amount of resources stored in the second data record is greater than $500, the trigger condition may be determined.

In one or more embodiments, the trigger condition may include determining that an amount of network traffic is less than a threshold. In these embodiments, the network traffic may include payment rail network traffic. The server computer system 120 may engage a network analyzer to monitor network traffic on a particular payment rail. The server computer system 120 may determine that the network traffic is less than a threshold and in response, the trigger condition may be determined.

The method 800 includes initiating a transfer of resources from the network restricted data record to a network unrestricted data record (step 860).

Responsive to determining the trigger condition, the server computer system 120 may initiate a transfer of resources. The transfer of resources may be from a network restricted data record to a network unrestricted data record.

In one or more embodiments, responsive to determining that the total amount of resources stored in the second data record is greater than $500, the server computer system 120 may initiate a transfer of resources to a network unrestricted data record. In this manner, only once a predefined amount of resources have been redeemed using stored-value cards for the merchant does the merchant actually have access to the resources. As such, the amount of transfers from the network restricted data record to the network unrestricted data record is reduced and as a result the overall reliance on the network is reduced.

In one or more embodiments, responsive to determining that the network traffic on a particular network, such as for example a payment rail network, is less than a threshold, the server computer system 120 may initiate a transfer of resources to the network unrestricted data record. As such, only when a particular network has sufficient bandwidth to handle the transfer does the server computer system 120 perform operations to initiate the transfer of resources.

In manners described herein, the server computer system 120 maintains all resources used to purchase stored-value cards and all resources redeemed using the purchased stored-value cards on behalf of the merchant. As mentioned, the merchant may not access the data records used to store the resources. This may ensure that the merchant (or a computing device of the merchant) does not occupy bandwidth on the network to access the data records. Only once a trigger condition has been determined does the server computer system 120 perform operations to initiate a transfer of resources to a network unrestricted data record. In this manner, the overall reliance on the network is reduced and bandwidth of the network is freed up for other operations that may require network usage.

In one or more embodiments described herein, a PIN may be required to redeem a stored-value card. The PIN may be generated by the server computer system 120 and/or may be defined by the customer purchasing the stored-value card. The PIN may be stored in association with the stored-value card identifier and may be required to redeem the stored-value card.

In one or more embodiments, the server computer system 120 may generate the PIN at the same time as generating the stored-value card identifier. The PIN may be provided to the customer purchasing the stored-value card within the stored-value card management application. The PIN may additionally or alternatively be communicated to the computing device 150 via text message or email.

In one or more embodiments, within the stored-value management application, the customer may pre-define a PIN that may be used for all stored-value cards purchased within the stored-value card management application. For example, the customer may define a PIN of "1234" within the stored-value card management application. Any stored-value cards purchased by the customer within the stored-value card management application may automatically be assigned the PIN of "1234" and this PIN may be stored in association with the stored-value card identifier.

It will be appreciated that in one or more embodiments described herein, the stored-value card identifier may be stored in the database in association with identifying information of the customer such as for example an email address of the customer. As such, the customer may request to retrieve any purchased stored-value cards maintained by the server computer system 120 using their email address. It will be appreciated that in embodiments where a PIN is required to redeem a stored-value card, the server computer system 120 may require the customer to provide the PIN prior to retrieving the stored-value card from the database.

Although in embodiments described herein, for example with reference to the method 600 shown in FIG. 6, a stored-value card is generated once it has been purchased by a customer, it will be appreciated that the stored-value cards may be generated prior to be purchased. For example, within the stored-value card management application, the merchant may be provided with a selectable interface element to pre-generate a predefined number of stored-value cards for one or more particular denominations. Responsive to selection of the selectable interface element, the server computer system 120 may generate the predefined number of stored-value cards in manners similar to that described herein. The pre-generated stored-value cards may be stored in the database in association with the merchant. A customer may purchase one of the stored-value cards and one of the pre-generated stored-value cards may be assigned automatically to the customer. In this manner, the merchant may control or limit the amount of stored-value cards that can be purchased by customers within the stored-value card management application.

It will be appreciated that in one or more embodiments, the server computer system 120 may store at least some of the details of a transaction in the database on behalf of the merchant. For example, responsive to obtaining transaction data (such as for example during step 810 of the method 800), the server computer system 120 may obtain the transaction identifier and may store the transaction identifier in the database in association with the stored-value card identifier. As another example, the server computer system 120 may store all of the transaction data in the database in association with the stored-value card identifier. In this manner, the merchant may track and manage what stored-value cards were used for what transactions and this may be done within the stored-value card management application.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A server computer system comprising:
a communications module;
a processor coupled with the communications module; and
a memory coupled to the processor and storing processor-executable instructions which, when executed by the processor, configure the processor to:
   obtain, via the communications module and from a computing device associated with a merchant, data;
   analyze the data to identify a stored-value card and an amount for the stored-value card;
   update a data record associated with the stored-value card based on the amount for the stored-value card;
   transfer resources to a network restricted data record that is associated with the merchant but cannot be accessed by the merchant based on the amount for the stored-value card;
   determine a trigger condition based on at least one of determining that a balance of the network restricted data record is greater than a balance threshold or determining that an amount of network traffic is less than a network traffic threshold; and
   responsive to determining the trigger condition, initiate a transfer of resources from the network restricted data record that is associated with the merchant but cannot be accessed by the merchant to a network unrestricted data record that is accessible by the merchant.

2. The server computer system of claim 1, wherein the network traffic includes payment rail network traffic.

3. The server computer system of claim 1, wherein the processor-executable instructions, when executed by the processor, further configure the processor to:
   receive, from another computing device, a request for the stored-value card;
   generate a stored-value card identifier for the stored-value card; and create the data record associated with the stored-value card, the data record including the stored-value card identifier.

4. The server computer system of claim 3, wherein the processor-executable instructions, when executed by the processor, further configure the processor to:
   retrieve, from a database, a white-label stored-value card template;
   obtain an image for the stored-value card;
   generate a machine-readable code for the stored-value card; and
   create a digital representation of the stored-value card by populating a first interface element of the white-label stored-value card template to include the image for the stored-value card and a second interface element of the white-label stored-value card template to include the machine-readable code for the stored-value card.

5. The server computer system of claim 4, wherein the processor-executable instructions, when executed by the processor, further configure the processor to:
   provision a mobile wallet resident on the other computing device with the digital representation of the stored-value card.

6. The server computer system of claim 4, wherein the processor-executable instructions, when executed by the processor, further configure the processor to:
   store the digital representation of the stored-value card in a database in association with an account that is accessible via a mobile application resident on the other computing device.

7. The server computer system of claim 1, wherein the network restricted data record tracks a total amount of resources based on stored-value cards used to complete transactions at the merchant.

8. The server computer system of claim 7, wherein the processor-executable instructions, when executed by the processor, further configure the processor to:
   transfer resources, from a network restricted data record that tracks a total amount of resources based on stored-value cards purchased for the merchant, to the network restricted data record that tracks the total amount of resources based on stored-value cards used to complete transactions at the merchant.

9. A computer-implemented method comprising:
   obtaining, via a communications module and from a computing device associated with a merchant, data;
   analyzing the data to identify a stored-value card and an amount for the stored-value card;
   updating a data record associated with the stored-value card based on the amount;
   transferring resources to a network restricted data record that is associated with the merchant but cannot be accessed by the merchant based on the amount for the stored-value card;
   determining a trigger condition based on at least one of determining that a balance of the network restricted data record is greater than a balance threshold or determining that an amount of network traffic is less than a network traffic threshold; and
   responsive to determining the trigger condition, initiating a transfer of resources from the network restricted data record that is associated with the merchant but cannot be accessed by the merchant to a network unrestricted data record that is accessible by the merchant.

10. The computer-implemented method of claim 9, wherein the network traffic includes payment rail network traffic.

11. The computer-implemented method of claim 9, further comprising:

receiving, from another computing device, a request for the stored-value card;

generating a stored-value card identifier for the stored-value card; and creating the data record associated with the stored-value card, the data record including the stored-value card identifier.

12. The computer-implemented method of claim 11, further comprising:

retrieving, from a database, a white-label stored-value card template;

obtaining an image for the stored-value card;

generating a machine-readable code for the stored-value card; and creating a digital representation of the stored-value card by populating a first interface element of the white-label stored-value card template to include the image for the stored-value card and a second interface element of the white-label stored-value card template to include the machine-readable code for the stored-value card.

13. The computer-implemented method of claim 12, further comprising:

provisioning a mobile wallet resident on the other computing device with the digital representation of the stored-value card.

14. The computer-implemented method of claim 12, further comprising:

storing the digital representation of the stored-value card in a database in association with an account that is accessible via a mobile application resident on the other computing device.

15. The computer-implemented method of claim 9, wherein the network restricted data record tracks a total amount of resources based on stored-value cards used to complete transactions at the merchant.

16. A non-transitory computer readable storage medium comprising computer-executable instructions which, when executed, configure a processor to:

obtain, via a communications module and from a computing device associated with a merchant, data;

analyze the data to identify a stored-value card and an amount for the stored-value card;

update a data record associated with the stored-value card based on the amount for the stored-value card;

transfer resources to a network restricted data record that is associated with the merchant but cannot be accessed by the merchant based on the amount for the stored-value card;

determine a trigger condition based on at least one of determining that a balance of the network restricted data record is greater than a balance threshold or determining that an amount of network traffic is less than a network traffic threshold; and responsive to determining the trigger condition, initiate a transfer of resources from the network restricted data record that is associated with the merchant but cannot be accessed by the merchant to a network unrestricted data record that is accessible by the merchant.

17. The server computer system of claim 4, wherein when obtaining the image for the stored-value card, the processor-executable instructions, when executed by the processor, further configure the processor to:

engage an application programming interface that employs artificial intelligence to identify or obtain the image.

* * * * *